United States Patent [19]

Chen et al.

[11] Patent Number: 4,833,279
[45] Date of Patent: May 23, 1989

[54] DIGITAL COMPUTER WRITING BOARD

[75] Inventors: Hsing Chen; Dar-Chang Juang, both of Hsinchu, Taiwan

[73] Assignee: Industrial Technology Research Institute, Taiwan

[21] Appl. No.: 112,245

[22] Filed: Oct. 21, 1987

[51] Int. Cl.⁴ ............................................. G08C 21/00
[52] U.S. Cl. .................................... 178/18; 310/311; 340/706; 364/521
[58] Field of Search ........................... 178/18, 19, 20; 310/311; 340/706, 711; 364/520, 521

[56] References Cited

U.S. PATENT DOCUMENTS

3,808,364  4/1974  Veith ................................ 178/18 X

*Primary Examiner*—Stafford D. Schreyer
*Attorney, Agent, or Firm*—Ladas & Parry

[57] ABSTRACT

A digital computer writing board making use of the piezoelectric characteristics by means of a soft piezoelectric film material to convert a physical pressure into an electrical signal, which is utilized to form fine electric polar lines of high resolution to be arranged into an upper layer and a lower layer quadraturally for subgroup encoding, then for reading out the positions of various signals which will be detected by a detection circuits and stored into a memory for processing by a computer and for displaying on the corresponding positions on the screen. The digital computer writing board is capable of having a common writing instrument (such as a pencil, ball pen ... etc.) directly writing or drawing and having those character tracings or graphic patterns thus left to be processed digitally for storage in a memory for further processing, display, identification within the computer terminal or for the transmission as an electronic document and printing out, with a view to providing a solution to such problems as one in which a hand writing of characters or graphs is insusceptibly connected within an interface of the computer or communication link. This has been a revolutional contribution as means inputing some handwriting to the computers of next generation.

2 Claims, 12 Drawing Sheets

ADDRESS  DETECTION TO STROBE

DIGITAL COMPUTER WRITING BOARD

DETAILED DESCRIPTION

A digital computer writing board of the present invention is mainly based on the piezo-electric characteristics of a soft film piezo-electric material such as Polyvinyliden Fluoride (PVDF) with a thickness approximately 30 um (even thinner than that of a common paper). A uniquely designed writing board of high resolution constructed of such material together with necessary detection circuits connected to a computer forms a device suitable for writing or drawing the characters or graphs with a common writing instrument (pencil, ball pen) and storing them into a memory or displaying them on a screen, or printing out in their original patterns without any change.

The computer writing boards or the computer tracing boards are generally divided into two major categories: i.e. one is electronic induction type and the other is pressure-resistance type; while both of them inherently have greatly facilitated computer processing operations the electronic induction type needs to use an induction pen with some uniquely-generated electronic signals or operated on the other principles (optically-induced or magnetically-induced) in order to use it in cooperation with the computer writing boards or tracing boards with a complete mutual induction so that they are not suitable for using a common writing instrument such as pencil, ball pen, ... , etc. This has been an inconvenience and will result in a higher cost of operation. For the other type of pressure-resistance, you use a kind of pressure-resistance material for converting the pressure into a change of resistance for further processing within a circuit. The signal is first processed through a circuit and converted into digital signal by means of an analogue A/D converter. However, an analogue circuit tends to produce errors which will result in distorted or less-accurate character tracings or graphic forms reproduced by the computer or processor. Furthermore, such circuit will be more complicated and cost more.

In view of such shortcomings as limitation, distortion, errors, etc inherent with the above-mentioned computer writing boards or tracing boards, the author of the present invention has, through his effors rendered in his course of development, successfully developed a computer writing board of the present invention.

In this connection, the digital computer writing board of this invention is essentially a writing faceplate of high resolution constructed with a soft film piezoelectric material. It is suitable for writing or drawing conveniently with a common writing instrument with the character tracing and/or graphic forms thus produced input in a high fidelity to a computer memory for storage or for a display on the screen, or for printing out, so as to achieve a goal of having a handwriting or graphic form reproduced completely in its original form.

The contents of the present invention is illustrated in an embodiment using Polyvinyliden Fluoride (PVDF) as a soft film piezoelectric material.

Digital computer writing board of the present invention is described in one embodiment with reference to accompanying drawings, in which.

Figure 1:
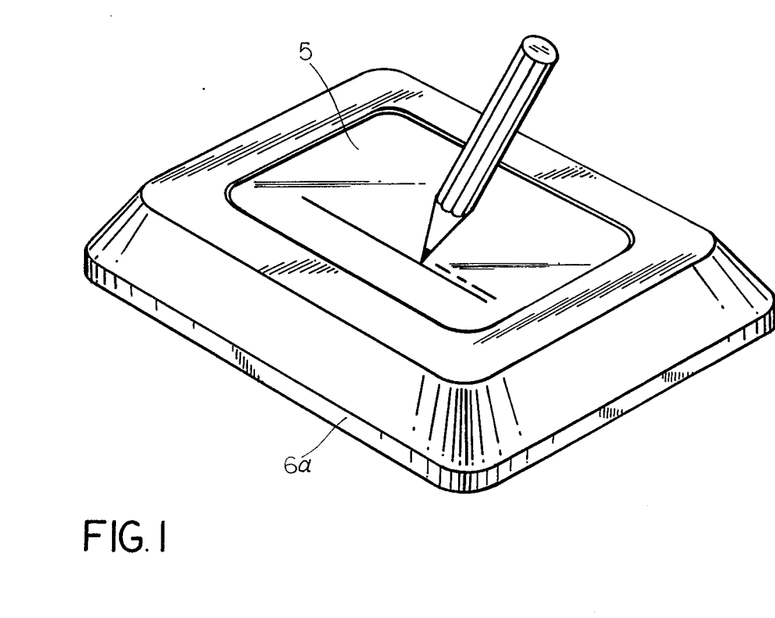
FIG. 1 shows a 3-dimensional graph of elevational outlook of digital computer writing board in one embodiment.
Figure 2:
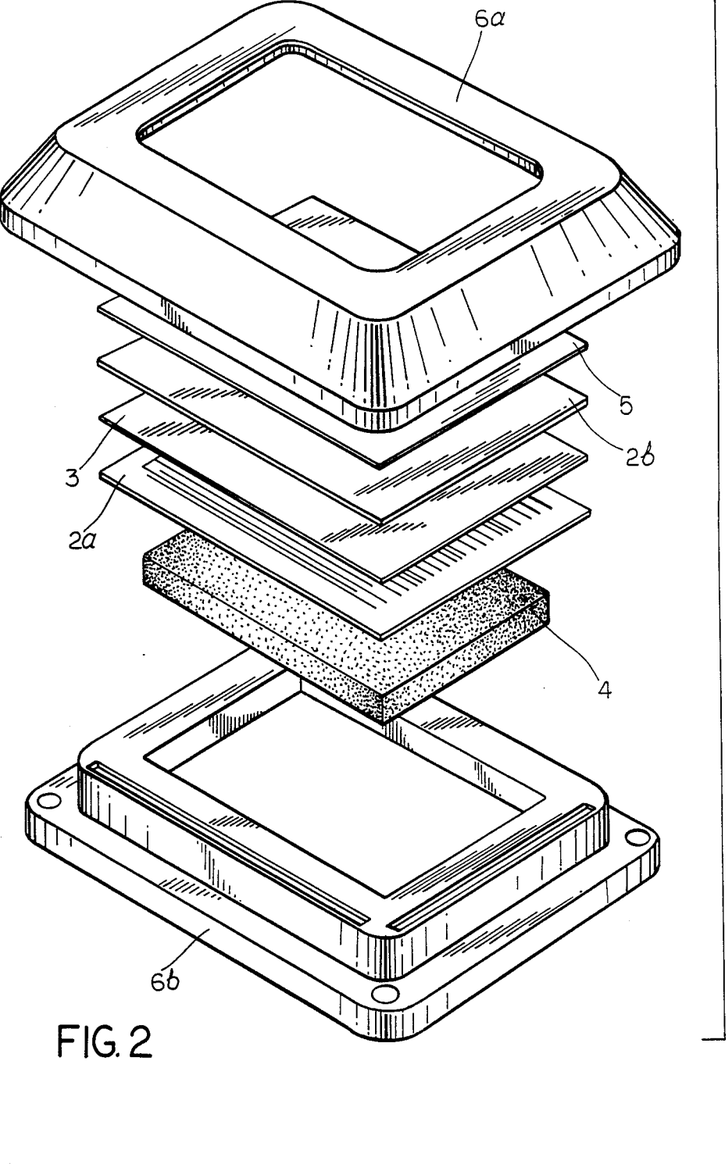
FIG. 2 shows a 3-dimensionally broken-away view of digital computer writing board of the present invention is one embodiment.

With reference to FIGS. 1 and 2, the digital computer writing board comprises mainly of such major elements as: a lower-layer PVDF piezoelectric film 2a and an upper-layer PVDF piezoelectric film 2b, and an insulated film 3, a resilient pad 4, a protective film 5, etc., in which the upper-layer and lower-layer piezoelectric films are treated with the optical masking techniques with the one side of electrically conductive metal electrode etched into a higher and a lower sub-groups organized electrode lines 21a, 21b (shown in FIGS. 3 and 4) and the other side of electrically conductive metal electrode 22a, 22b serving as a common grounding so that the two PVDF piezoelectric film electrode lines will be opposite and mutually intersected perpendicularly arranged with a layer of insulation film inserted between to make them adhered together. The bottom edge of the combined piezoelectric film is supported by a resilient pad 4 while its top is covered with a layer of protective film 5 attached between the plate base 6a and 6b so as to cooperate with the scanning and detection circuits to form a digital computer writing board. The board is connected to a computer and is available for writing or drawing on a protective film 5 having a surface resistant to scratches from a common writing instrument (such as a pencil, ball pen . . . , etc. ). The pressure force applied by the writing action on the upper and lower layer of PVDF piezoelectric film resiliently supported by pad 4 will generate a voltage signal which is scanned by the scanning circuit to read the signal positions produced at various different signal points and then detected by the detection circuit for a storage in a memory. Thus detecting by scanning at high resolution which will make it possible for the handwriting or graphic tracings left on the faceplate to be input in their original form to the computer storage memory or for display on a screen, or to be printed out with high accuracy and fidelity.

In the preferred embodiment the digital computer writing board is constructed of PVDF piezoelectric material which is characterized in converting the pressure into a voltage signal; wherein PVDF has a polarity of semi-crystal polymer, its crystal is approximately 50% with a main phase of $a^-$ in which the arrangement directions of two adjacent molecular links are opposite and their polarities cancelled each other, while in phase $B^-$ their polarity directions are in parallel so as to make that vertical to the molecular link upward up to a even electron torque of $6.9 \times 10^{-30} c-m(2.1D)$. Therefore, the existence of phase $B^-$ constitutes a main source of piezoelectricity.

Figure 5:
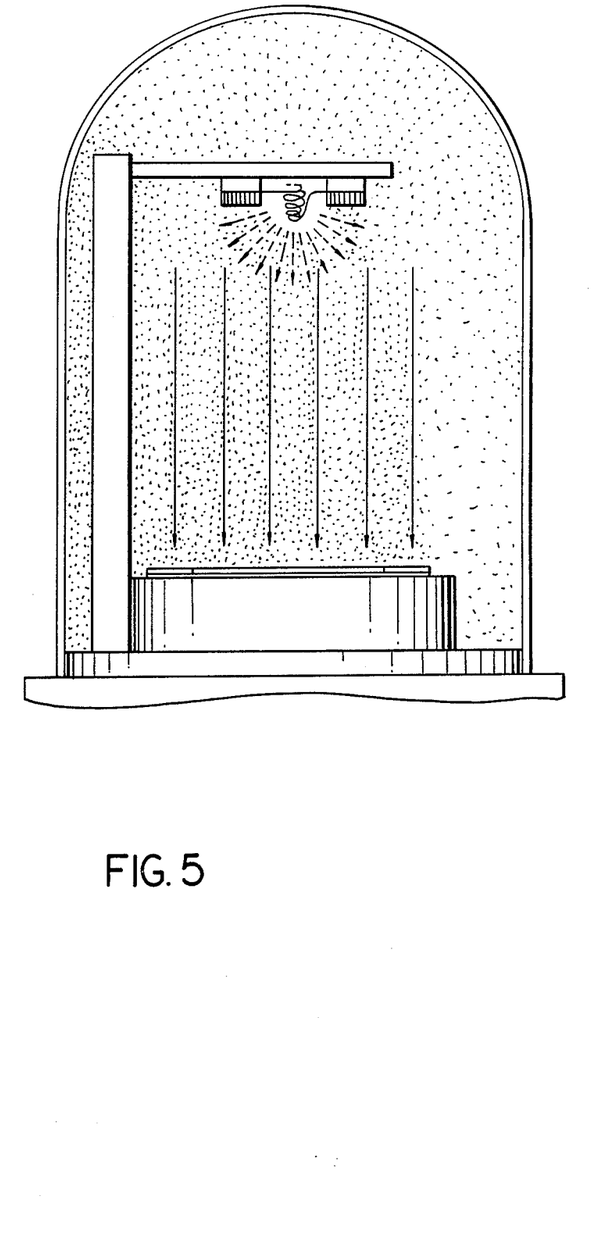
FIG. 5 shows a graph of PVDF piezoelectric film vaporization plating electrode processing.

A PVDF film is produced by means of a Melt Extrusion method or a Blowing method, with a film thickness of 10 um–75 um. To convert the phase $a^-$ as existed originally into a phase $B^-$ of an even-polarity, it must undergo steps such as extention, polarization, etc. It is constructed by extending the PVDF film uni-axially or biaxially approximately 4 times under a temperature of 30° C.–100° C., so as to convert the PVDF film from one of non-polarity of phase $a^-$ into one of a polarity of phase $B^-$; then both surfaces of such PVDF film of phase $B^-$ will be plated with an electrically conductive metal film by means of the vacuum vaporizing plating method (as shown in FIG. 5) to serve as a positive and a negative electrode; the reason why such vacuum vaporizing plating method is used to plate the electrically conductive metal film electrodes is the fact that the particles of such electrically conductive metal film are fine and uniform with a very small thickness, strong cohesion and thus a high piezoelectric conversion rate. In case a spraying method or screen printing method is used, the resulting thickness of such electrically conductive metal film will be relatively larger, thus a coarser particles, poorer cohesion, and thus a lower piezoelectricity conversion rate.

Figure 6:
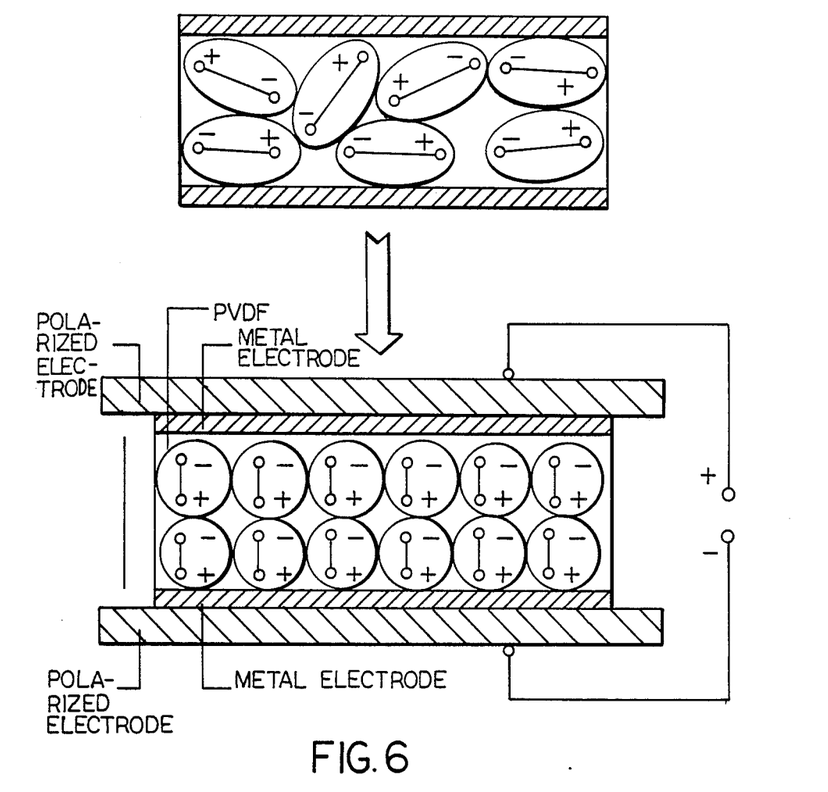
FIG. 6 shows a graph of PVDF piezoelectric film polarization treatment.
Figure 7:
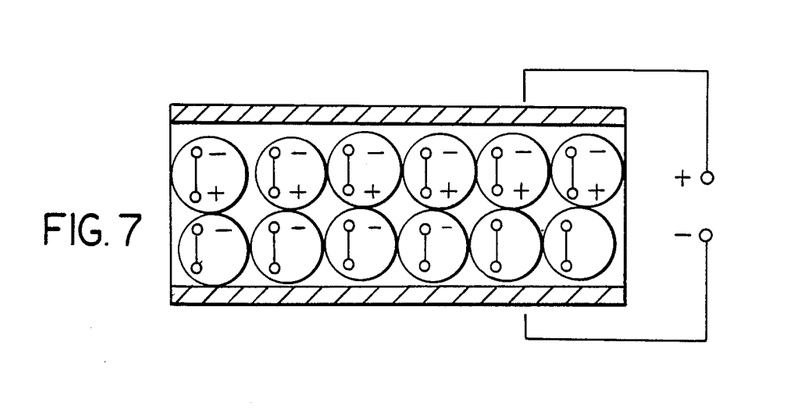
FIG. 7 shows a graph of voltage signal PVDF piezoelectric film.

After both surfaces of PVDF film of polarity of phase $B^-$ are plated with an electrically conducted metal film, it must be polarized under a DC high voltage electrical field (as shown in FIG. 6). To polarize it by means of a thermal contact process, the PVDF film plated with an electrically conductive metal film on its surface is to be clamped between two electrodes in a 80 MV/m DC electrical field under a temperature of 150° C. or lower for an hour in order to complete the polarization to constitute a piezoelectric material (element) (as shown in FIG. 7). The polarized PVDF film is capable of converting a pressure into a potential signal. A PVDF piezoelectric material is characterized by its small thickness and its softness as well as its controllable area in size.

While there have been quite a number of piezoelectric such as porcelain PZT, PLZT, high-molecular, PVDF, and porcelain and rubber compound materials, however, to apply it to a piezoelectric computer writing board, a quality of thinness, softness and firmness is necessary. In this sense, the only material applicable is one of soft film piezoelectric material.

Figure 3:
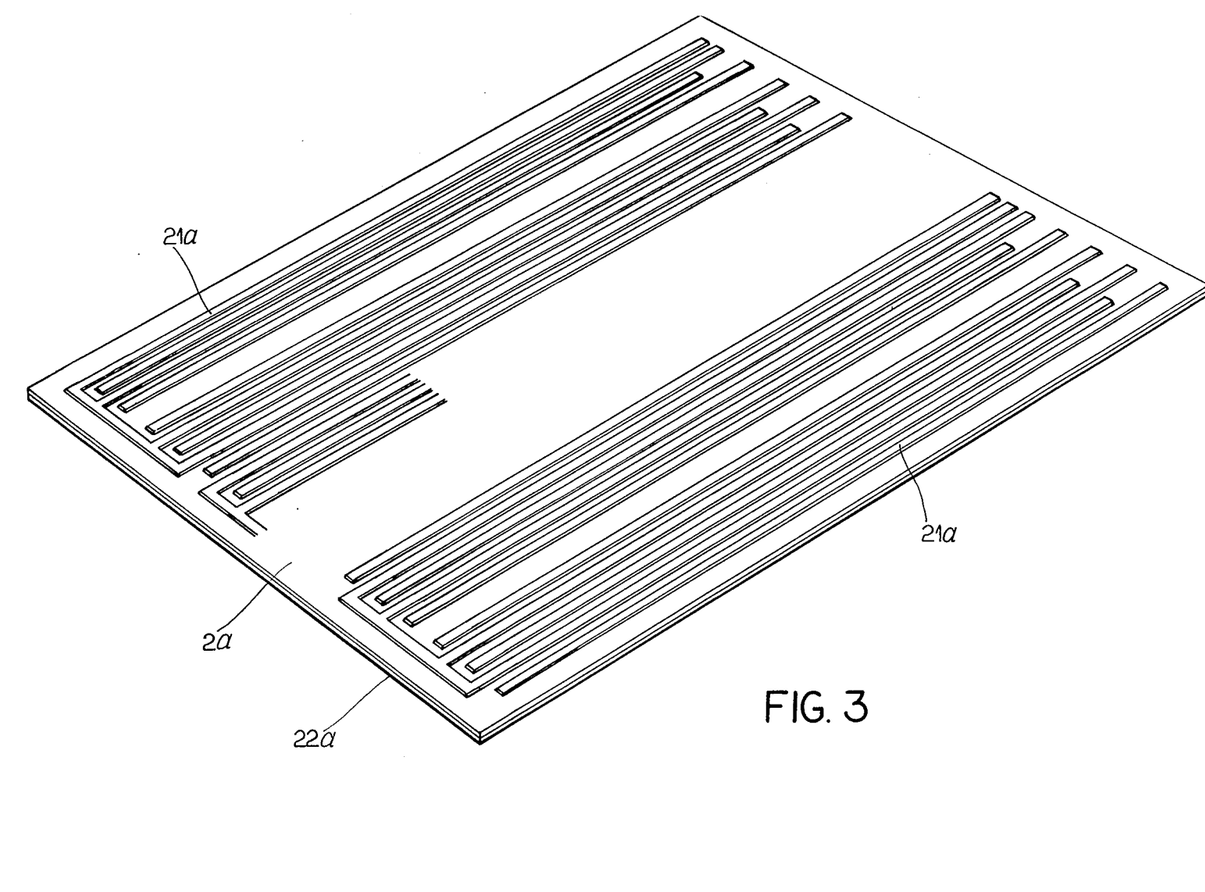
FIG. 3 shows a 3-dimensional graph of lower-layer piezoelectric film of digital computer writing board in one embodiment.
Figure 4:
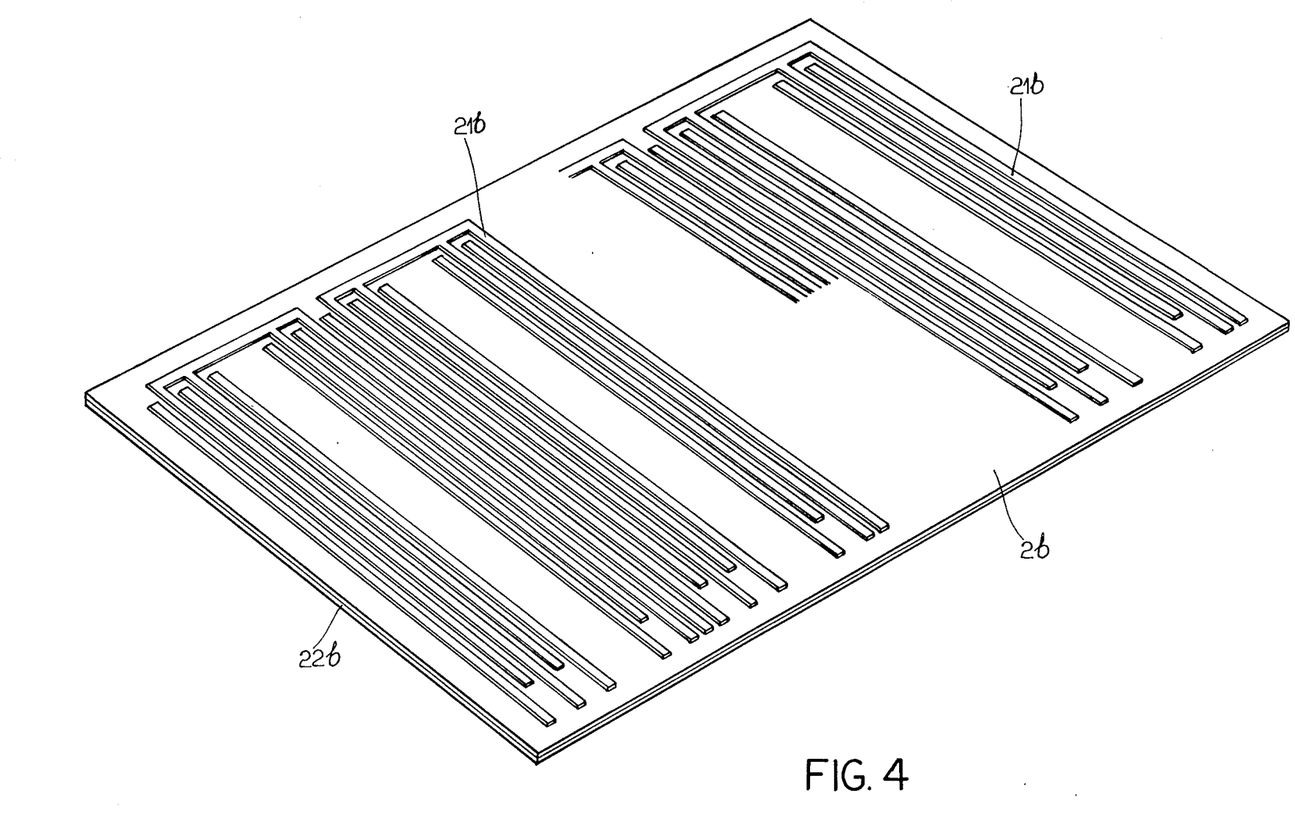
FIG. 4 shows a 3-dimensional graph of upper-layer piezoelectric film of digital computer writing board in one embodiment.

After the treatment of polarization, the PVDF piezoelectric film is pressed into one piece together with a dry film photo resistor. Such combination is further processed with optical masking, developing and etching so as to eliminate the undesired metal portion by etching while the remainder are fine electrode lines in upper or lower sub-groups (as shown in FIGS. 3 and 4), so as to have an insulation film interfaced between both PVDF piezoelectric films while such electrode lines are facing opposite with the upper layer and lower layer are intersected with each other disposed and cohered together in cooperation with the resilient pad and the protective film clamped therein and secured to the plate base, wiring the scanning circuit and detection circuit to the computer to form a digital computer writing board of high resolution.

Figure 8:
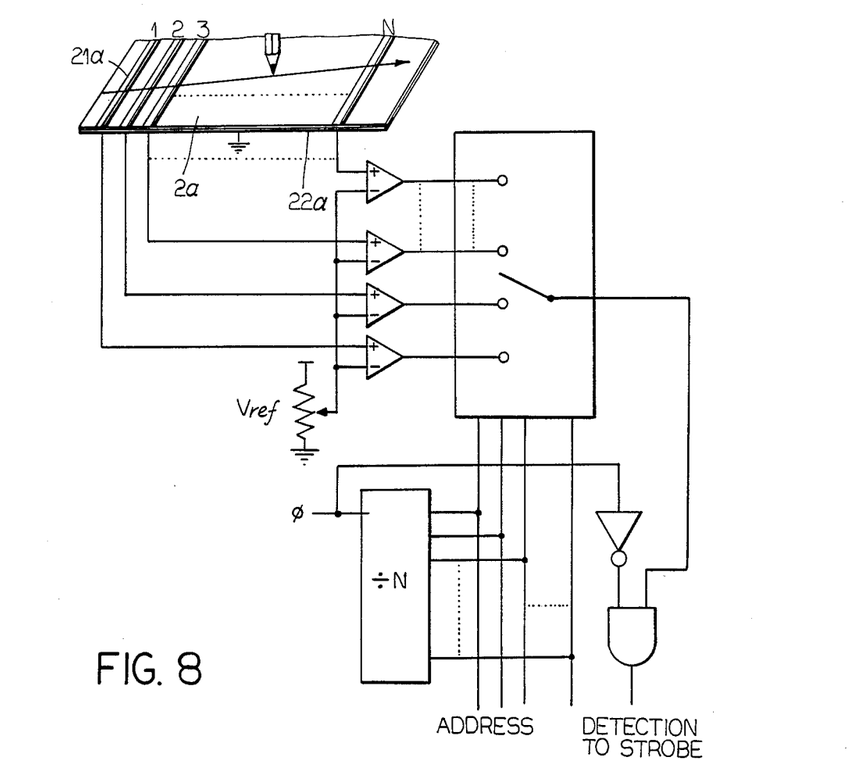
FIG. 8 shows a circuit diagram for mono-layer scanning and detection of digital computer writing board of the present invention.
Figure 8A:
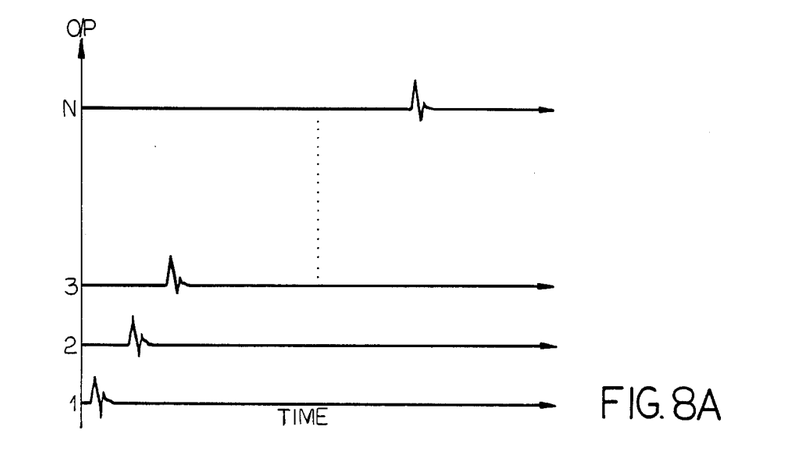
FIG. 8a shows the waveforms of mono-layer scanning and detection signal of digital computer writing board of the present invention.
Figure 9:
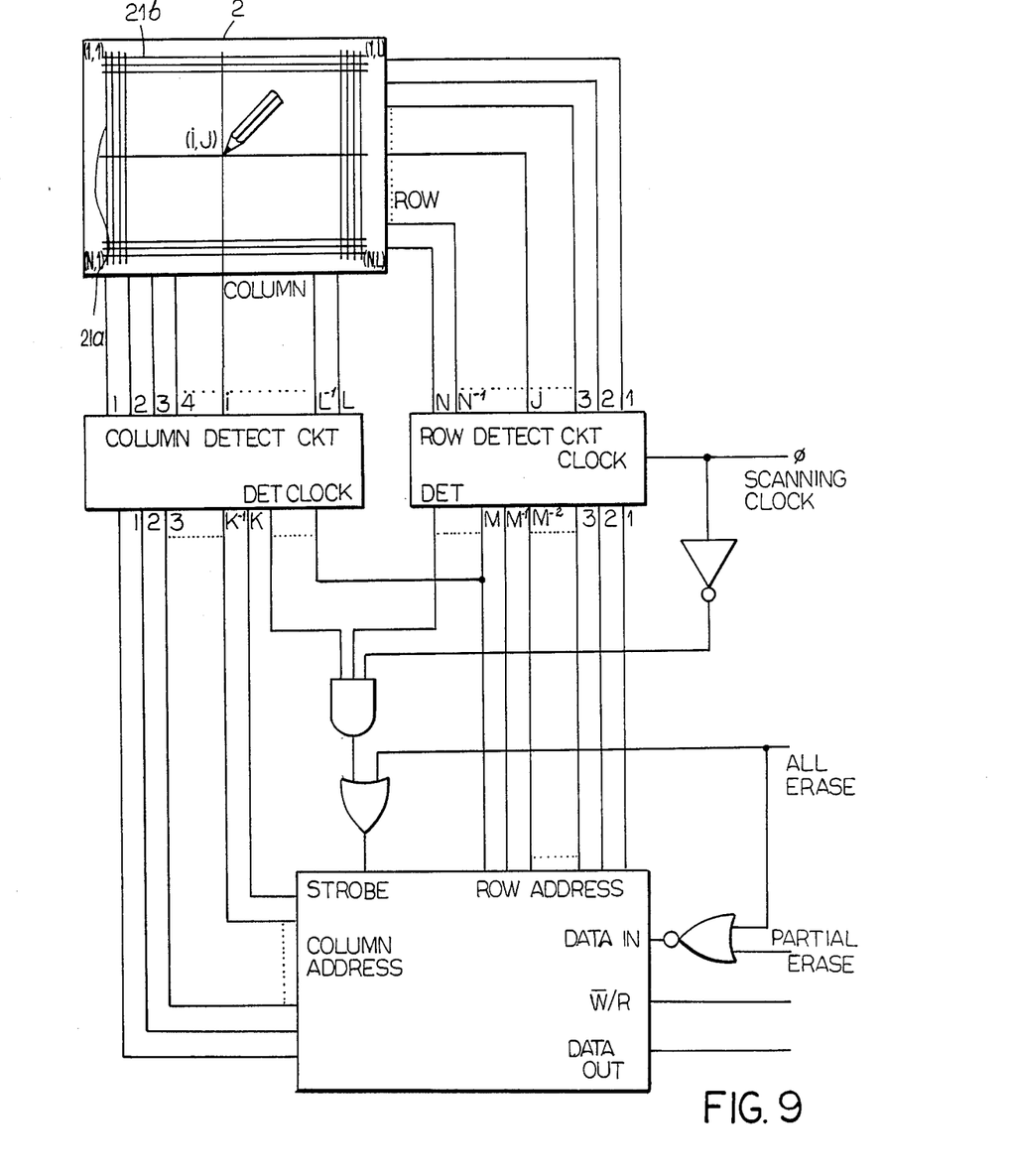
FIG. 9 shows a graph illustrating the operational principles of scanning and detection circuit of digital computer writing board of the present invention.
Figure 10:
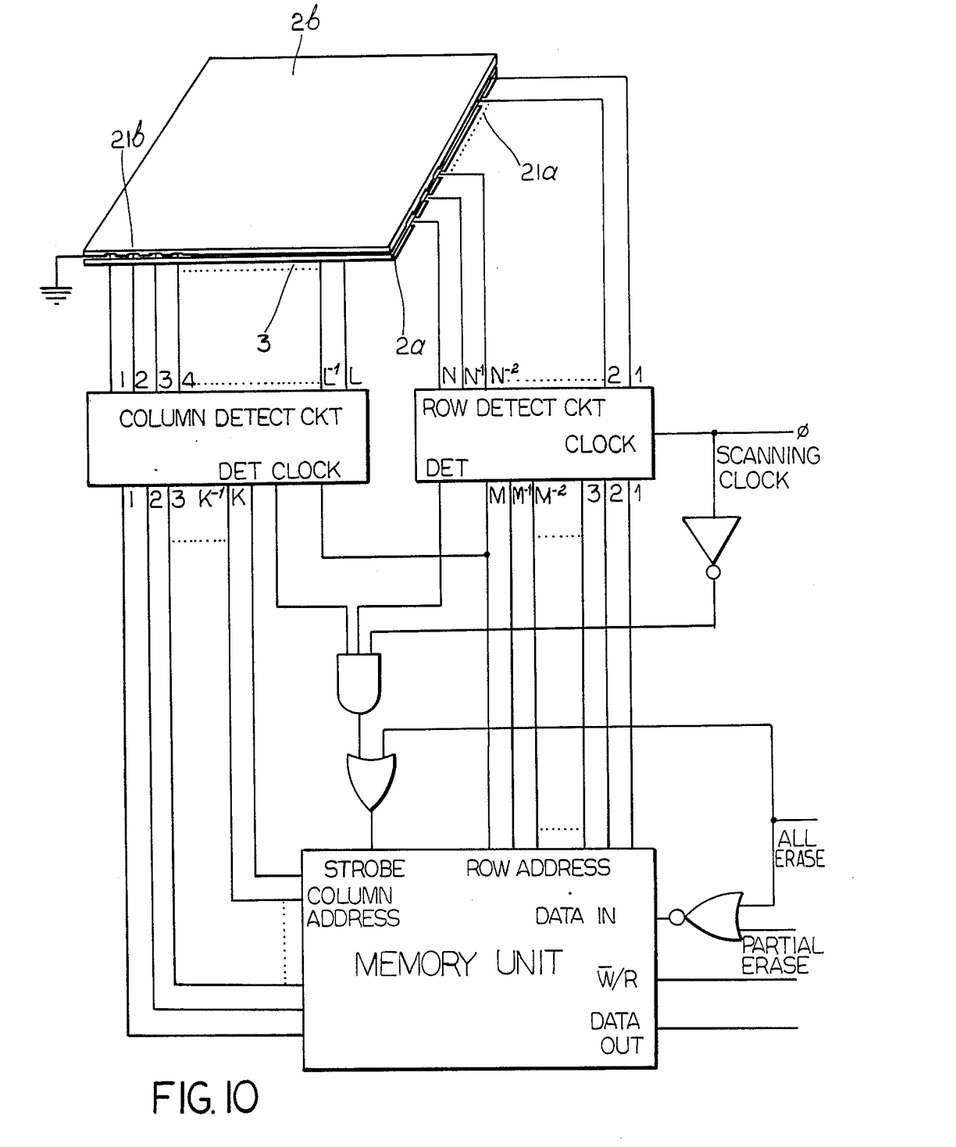
FIG. 10 shows the block diagram and wiring of a complete circuit of digital computer writing board of the present invention.

In the electronic signal detection circuit of digital computer writing board, a subgroup coding scanning is used for scanning and detecting the potential signals generated by the fine electrode lines on PVDF piezoelectric film as shown in FIG. 8. A potential signal is induced in a fine electrode line on uni-layer PVDF piezoelectric film when struck with a writing instrument from the first electrode line through the second and the third successively and continuously to the $n^{th}$ electrode line. As the pressure imposed to various electrode lines by the writing instruments is converted into a potential signal. The potential signal is successively scanned, detected and utilized to generate the signals shown in FIG. 8a. In addition, when the electrode lines of both PVDF piezoelectric film are intersected perpendicular to one another (as shown in FIGS. 9 and 10), the row, column scanning signals generated by scanning and detection circuits scan from the first row (1, 1), (1, 2), (1, 3), ... to (1, L), and then from the second row (2, 1), (2, 2), (2, 3), ... to (2, L). In this way, it scans each row individually from the top to the bottom until (N, L), repeats reciprocally cycle by cycle in sequence. When there is potential signal induced at a scanned position, such induced signal will pass through fine electrode lines on the corresponding row, column and transfered to the comparator array within the scanning and detection circuits (as shown in FIG. 12 and FIG. 12a), converted into digital signal of 0, 1 according to the signal strength, and then again scanned by multiplexer*, the signal thus detected (DET) and the digital signal of scanning signal (relative to row, column address signal) is controlled by a simple logic gate and connected to an interface circuit or memory.

*Note: (the sensitivity of a comparator serves to adjust the external reference voltage according to the strength of writing pressure to achieve an optimum matching to adapt to the habitual writing pressure of each individual writer.)

Figure 11:
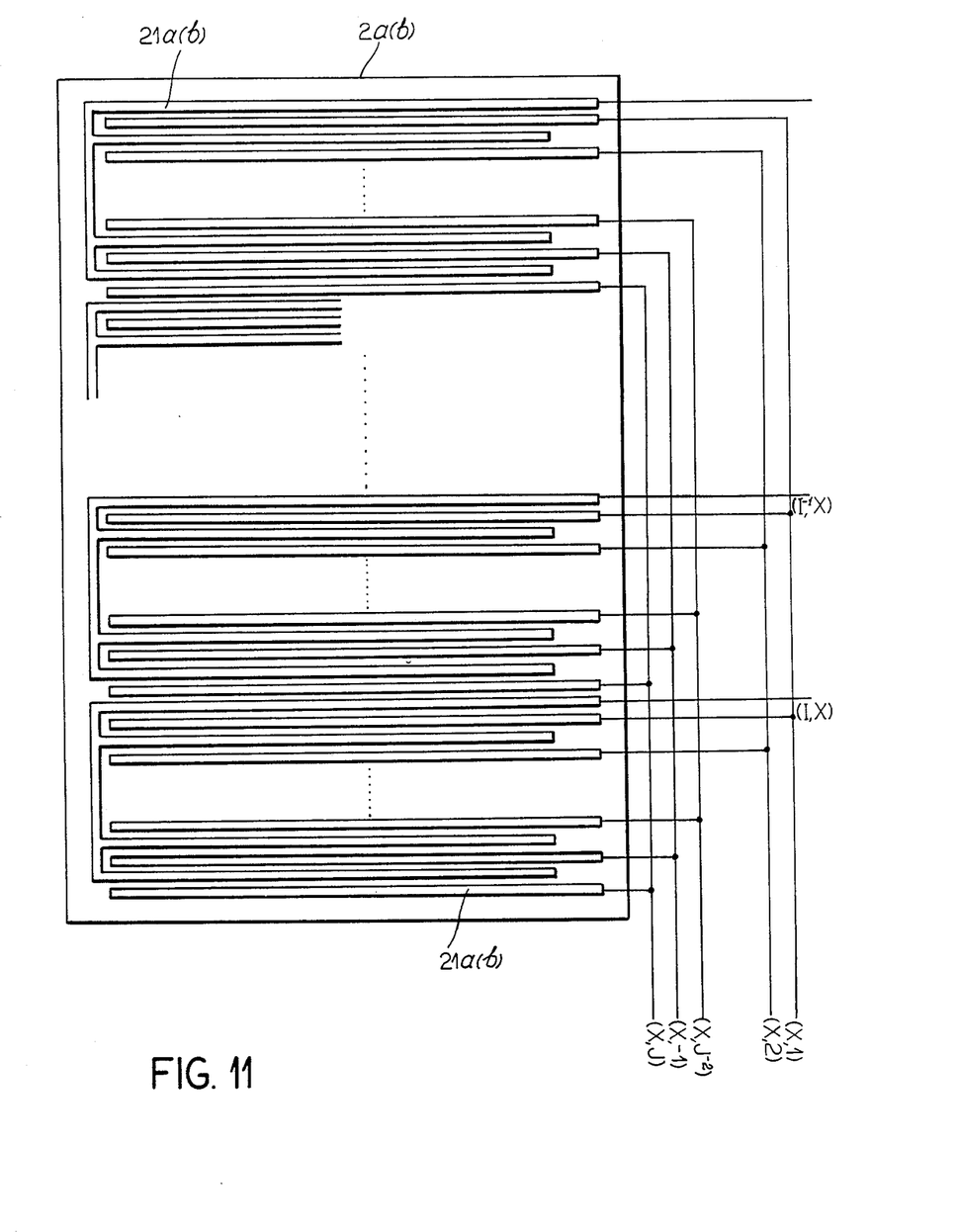
FIG. 11 shows the wiring diagram of sub-group encoding scanning frame of digital computer writing board of the present invention.
Figure 12:
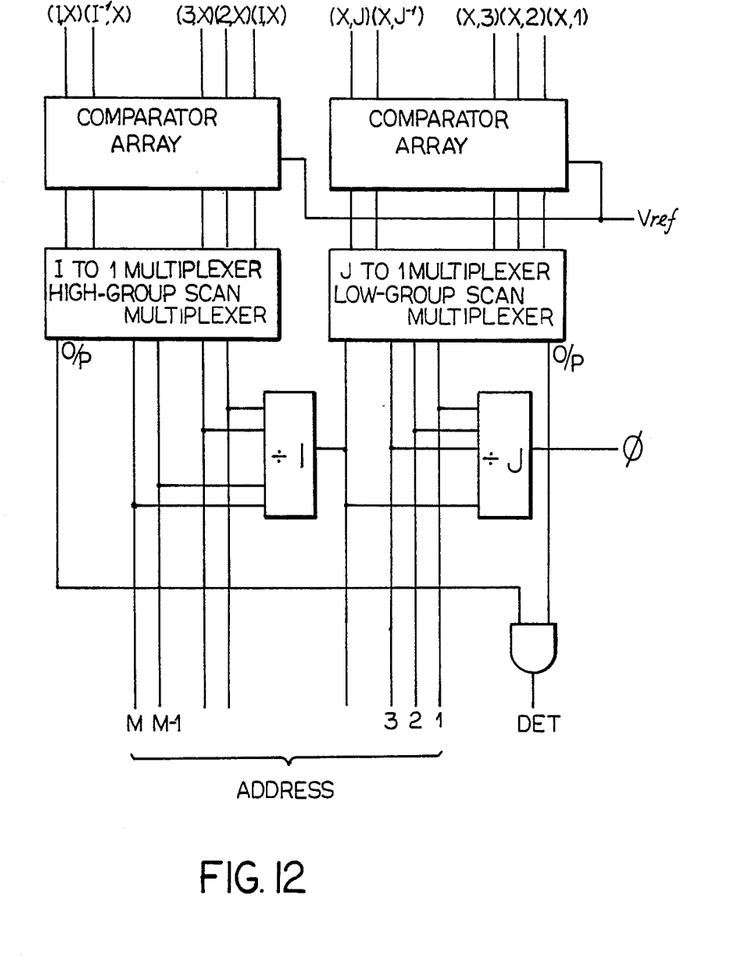
FIG. 12 shows the circuit diagram of sub-group encoding scanning and detection of digital computer writing board of the present invention.
Figure 12A:
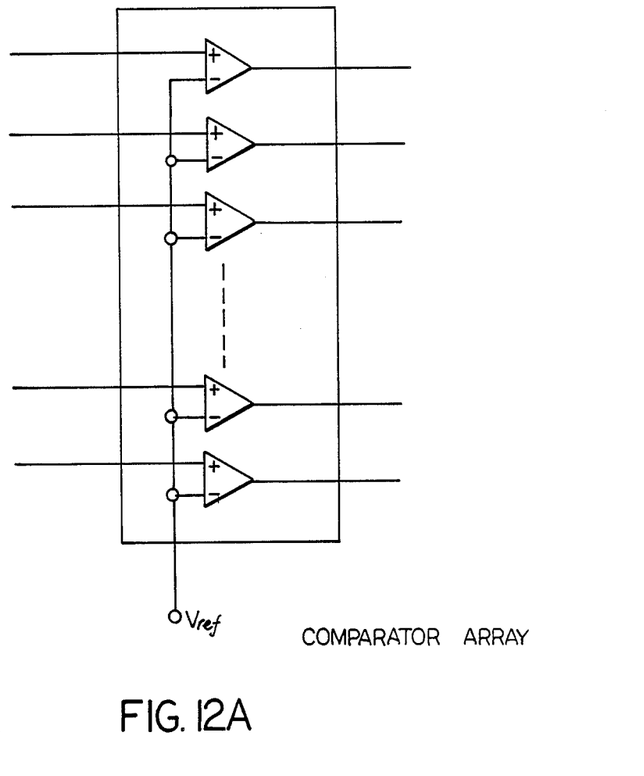
FIG. 12a shows the circuit diagram of a comparator array shown in FIG. 12.

In the column, row scanning and detection circuit of digital computer writing board, a subgroup coding scanning frame is used, with its operating principles and the wiring shown in FIGS. 11 and 12. The sub-group electrode lines on PVDF piezoelectric film are divided into several high groups while the frequency of scanning clock (approx. 4 MHz) is divided by a binary counter, also divided into high and low groups for pushing the multiplexer of high group (collective group I to 1 multiplexer on FIG. 12) and low group (dispersed group J to 1 multiplexer on FIG. 12) to scan fine electrode line group.

When I to 1 multiplexer scans the first of high groups, the J to 1 multiplexer will scan all low groups. However, because of the logic gate control exercised by the detection circuit, it will cause the signal detected in the area of first high group to be valid, similarly, as the second high group is scanned, only the signal within the second high group being valid, and so forth until the last high group and then the cycle repeats, while the binary address signals corresponding to the high group and low group scanning signals are divided into High Nibble and Low Nibble. A complete address signal formed by the both represents the column or row address signal.

The advantages of the frame of coding scanning by groups used in the digital computer writing board will greatly reduce the number of input terminals of both comparator and multiplexer. For example, each column or row has 256 fine electrode lines which are divided into 16 high groups and 16 low groups, for which the scanners require only 32 input terminals for comparators and multiplexers (16 input terminals for high groups and 16 input terminals for low groups). A common non-coded scanning technique requires 256 input terminals for both the comparators and multiplexers. It can be seen from this that the scanning by coding as used in the present invention has been capable of very effectively reducing the circuit complexity and greatly reducing the cost.

Based on the above discussion on the digital computer writing board of the present invention, the fine electrode lines by groups of high, low soft piezoelectric film are disposed perpendicularly to each other to combine insulation film, resilient pad and protective film in performing the scanning and detection by groups within scanning, detection circuits to form a computer writing board of high resolution, in which a common writing instrument can be used to write or draw directly, while the character tracig and groups signal can be read in their original form and to achieve a goal of having all written or drawn stored in a memory, or displayed on a screen, or printed out accurately with their fidelity. The present invention of computer writing board has a complete new and inventive design with highly practical value.

We claim:

1. A digital computer writing board comprising:
    an upper and a lower layer of soft piezoelectric film, one surface of each of the two layers having an electrically conductive film for connecting to ground while the other surface having electrode lines arranged in groups, with the electrode lines on one layer being disposed perpendicular to the other;
    an insulation film disposed between the upper and the lower layers of soft piezoelectric film and adhered integrally to the said two layers;
    a resilient pad located beneath the bottom surface of the lower layer of soft piezoelectric film;
    a protective film covering the top surface of the upper layer of soft piezoelectric film; and
    a scanning and detection circuit arranged in coded groups coupled to said electrode lines;
    whereby characters can be written or graphs drawn on the digital computer writing board with an ordinary writing instrument and the characters or graphs can be stored in a memory of a computer or displayed on a screen of a computer display or printed by a printer of a computer system.

2. A digital computer writing board as claimed in claim 1, wherein the scanning and detection circuit is arranged in coded groups at each input and input signals to the circuit are digitized before they are scanned by a high-group multiplexer and a low-group multiplexer.

* * * * *